United States Patent
Nie et al.

(10) Patent No.: US 9,047,901 B1
(45) Date of Patent: Jun. 2, 2015

(54) DISK DRIVE MEASURING SPIRAL TRACK ERROR BY MEASURING A SLOPE OF A SPIRAL TRACK ACROSS A DISK RADIUS

(71) Applicant: Western Digital Technologies, Inc., Irvine, CA (US)

(72) Inventors: Jianbin Nie, Fremont, CA (US); Edgar D. Sheh, San Jose, CA (US); Siri S. Weerasooriya, Campbell, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/903,197

(22) Filed: May 28, 2013

(51) Int. Cl.
*G11B 5/596* (2006.01)
*G11B 21/02* (2006.01)

(52) U.S. Cl.
CPC ..................................... *G11B 5/596* (2013.01)

(58) Field of Classification Search
None
See application file for complete search history.

(56) References Cited

U.S. PATENT DOCUMENTS

| | | | |
|---|---|---|---|
| 5,649,185 A | 7/1997 | Antognini et al. |
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |

(Continued)

OTHER PUBLICATIONS

Jiangang Liang, et al., U.S. Appl. No. 13/431,680, filed Mar. 27, 2012, 30 pages.

(Continued)

*Primary Examiner* — K. Wong

(57) ABSTRACT

A disk drive is disclosed comprising a disk comprising at least one spiral track, a head, and an actuator operable to actuate the head over the disk. A slope of the spiral track is measured at a plurality of radial locations across the disk, and a spiral track error at each radial location is generated based on a difference between the measured slope and a target slope. The head is actuated over the disk based on the spiral track and the spiral track error.

22 Claims, 8 Drawing Sheets

(56) References Cited

U.S. PATENT DOCUMENTS

| | | | |
|---|---|---|---|
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,549,490 B1 | 4/2003 | Howarth |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,799,274 B1 | 9/2004 | Hamlin |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,853,731 B1 | 2/2005 | Boyle et al. |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,950,441 B1 | 9/2005 | Kaczmarczyk et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,978,348 B2 | 12/2005 | Belknap et al. |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,027,716 B1 | 4/2006 | Boyle et al. |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,106,947 B2 | 9/2006 | Boyle et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,292,775 B1 | 11/2007 | Boyle et al. |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,426,329 B2 | 9/2008 | Calhoon et al. |
| 7,433,143 B1 * | 10/2008 | Ying et al. ..................... 360/51 |
| 7,440,210 B1 | 10/2008 | Lee |
| 7,440,225 B1 | 10/2008 | Chen et al. |
| 7,444,388 B1 | 10/2008 | Svendsen |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,487,312 B2 | 2/2009 | Paveza et al. |
| 7,489,464 B1 | 2/2009 | McNab et al. |

(56) References Cited

U.S. PATENT DOCUMENTS

| | | |
|---|---|---|
| 7,492,546 B1 | 2/2009 | Miyamura |
| 7,495,857 B1 | 2/2009 | Bennett |
| 7,499,236 B1 | 3/2009 | Lee et al. |
| 7,499,938 B2 | 3/2009 | Collart |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,577,677 B2 | 8/2009 | Collart |
| 7,580,212 B1 | 8/2009 | Li et al. |
| 7,583,470 B1 | 9/2009 | Chen et al. |
| 7,587,446 B1 | 9/2009 | Onyon et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,653,761 B2 | 1/2010 | Juster et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,730,132 B2 | 6/2010 | Ludwig et al. |
| 7,733,189 B1 | 6/2010 | Bennett |
| 7,735,145 B2 | 6/2010 | Kuehnel et al. |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,770,025 B2 | 8/2010 | Bobrow |
| 7,800,853 B1 | 9/2010 | Guo et al. |
| 7,800,856 B1 | 9/2010 | Bennett et al. |
| 7,800,857 B1 | 9/2010 | Calaway et al. |
| 7,814,554 B1 | 10/2010 | Ragner |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 * | 12/2010 | Liang et al. .................. 360/75 |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,422 B1 * | 12/2011 | Ton-That et al. .................. 360/75 |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 2001/0029583 A1 | 10/2001 | Palatov et al. |
| 2001/0036031 A1 | 11/2001 | Hirano et al. |
| 2001/0042170 A1 | 11/2001 | Belknap et al. |
| 2001/0056541 A1 | 12/2001 | Matsuzaki et al. |
| 2002/0104019 A1 | 8/2002 | Chatani et al. |

(56) References Cited

U.S. PATENT DOCUMENTS

| | | |
|---|---|---|
| 2002/0166035 A1 | 11/2002 | Belknap et al. |
| 2005/0120380 A1 | 6/2005 | Wolfe |
| 2005/0210101 A1 | 9/2005 | Janik |
| 2005/0281470 A1 | 12/2005 | Adams |
| 2006/0245725 A1 | 11/2006 | Lim |
| 2007/0055982 A1 | 3/2007 | Spilo |
| 2007/0056013 A1 | 3/2007 | Duncan |
| 2007/0174140 A1 | 7/2007 | Noonan et al. |
| 2007/0250193 A1 | 10/2007 | Raines et al. |
| 2008/0152305 A1 | 6/2008 | Ziegler |
| 2008/0199006 A1 | 8/2008 | Gandolph et al. |
| 2008/0249874 A1 | 10/2008 | Seo |
| 2009/0094160 A1 | 4/2009 | Webster et al. |
| 2009/0169020 A1 | 7/2009 | Sakthikumar et al. |
| 2009/0249420 A1 | 10/2009 | Kim et al. |
| 2009/0282462 A1 | 11/2009 | Skaria et al. |
| 2010/0011351 A1 | 1/2010 | Tsvi et al. |
| 2010/0030867 A1 | 2/2010 | Yao |
| 2010/0035085 A1 | 2/2010 | Jung et al. |
| 2010/0146269 A1 | 6/2010 | Baskaran |
| 2010/0228989 A1 | 9/2010 | Neystadt et al. |
| 2010/0318417 A1 | 12/2010 | Brisebois et al. |
| 2012/0023139 A1 | 1/2012 | Greeley |
| 2012/0036041 A1 | 2/2012 | Hesselink |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

Brian R Rigney, et al., U.S. Appl. No. 13/205,072, filed Aug. 8, 2011, 41 pages.

* cited by examiner

DISK DRIVE MEASURING SPIRAL TRACK ERROR BY MEASURING A SLOPE OF A SPIRAL TRACK ACROSS A DISK RADIUS

BACKGROUND

When manufacturing a disk drive, concentric servo sectors $2_0$-$2_N$ are written to a disk 4 which define a plurality of radially-spaced, concentric servo tracks 6 as shown in the prior art disk format of FIG. 1. A plurality of concentric data tracks are defined relative to the servo tracks 6, wherein the data tracks may have the same or a different radial density (tracks per inch (TPI)) than the servo tracks 6. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target data track during a seek operation, and the servo bursts 14 are processed to maintain the head over a centerline of the target data track while writing or reading data during a tracking operation.

In the past, external servo writers have been used to write the concentric servo sectors $2_0$-$2_N$ to the disk surface during manufacturing. External servo writers employ extremely accurate head positioning mechanics, such as a laser interferometer, to ensure the concentric servo sectors $2_0$-$2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

DETAILED DESCRIPTION

Figure 1:
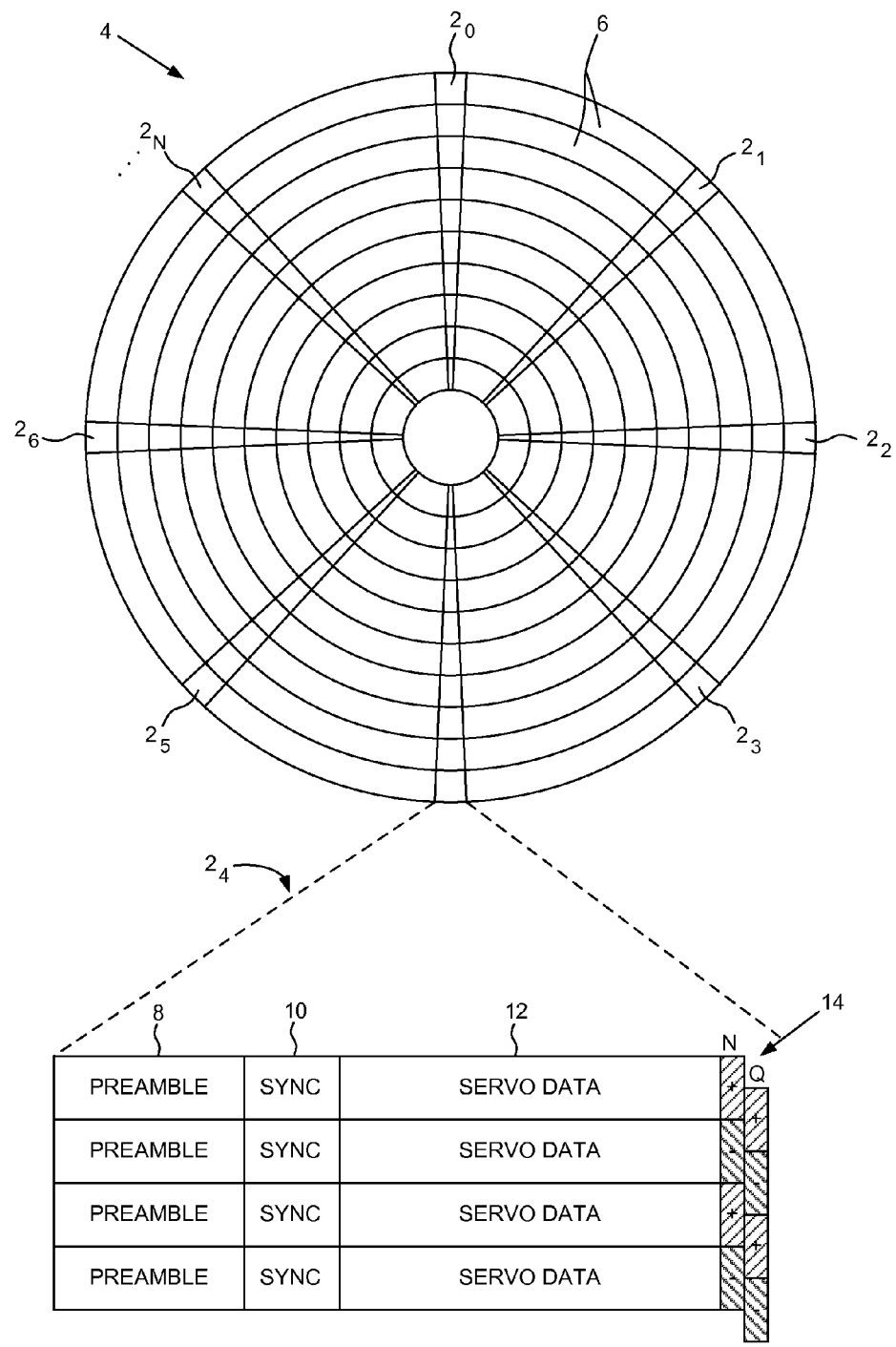
FIG. 1 shows a prior art disk format comprising a plurality of servo tracks defined by embedded servo sectors.
Figure 2A:
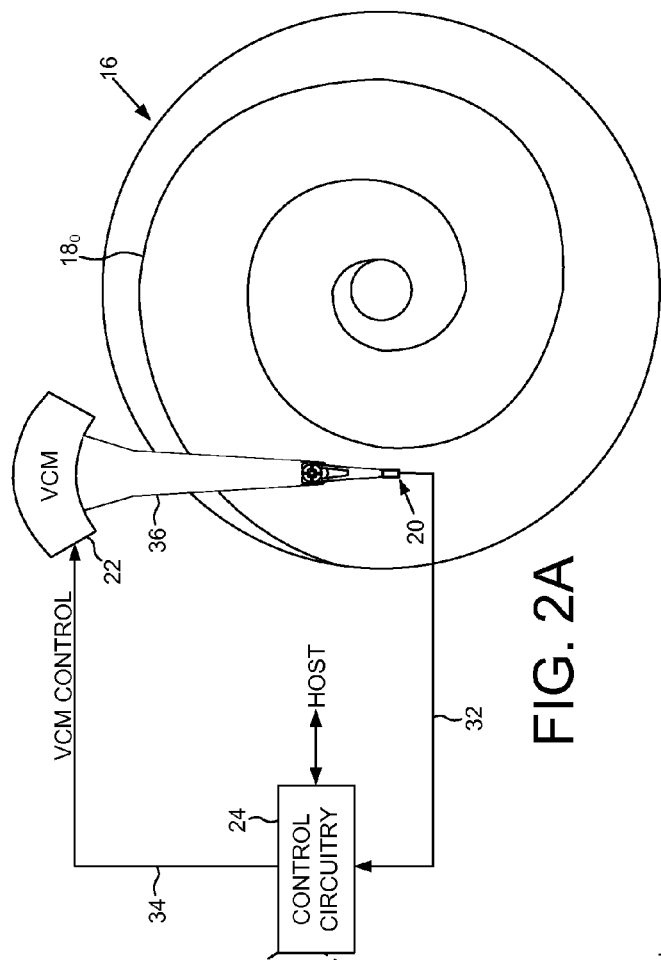
FIG. 2A shows a disk drive according to an embodiment comprising a head actuated over a disk comprising a spiral track.
Figure 2B:
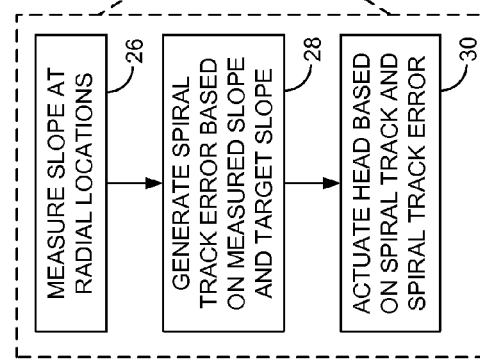
FIG. 2B is a flow diagram according to an embodiment wherein spiral track error is generated based on a measured slope and a target slope of the spiral track.

FIG. 2A shows a disk drive according to an embodiment comprising a disk 16 comprising at least one spiral track $18_0$, a head 20, and an actuator 22 operable to actuate the head 20 over the disk 16. The disk drive further comprises control circuitry 24 operable to execute the flow diagram of FIG. 2B, wherein a slope of the spiral track is measured at a plurality of radial locations across the disk (block 26), and a spiral track error at each radial location is generated based on a difference between the measured slope and a target slope (block 28). The head is actuated over the disk based on the spiral track and the spiral track error (block 30).

Figure 2C:
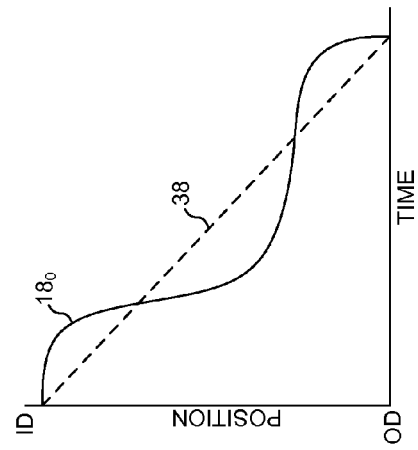
FIG. 2C illustrates a spiral track error between a measured slope and a target slope of an ideal spiral track.

In one embodiment, the control circuitry 24 processes a read signal 32 emanating from the head 20 to measure the slope of the spiral track $18_0$ in order to generate the spiral track error. The control circuitry 24 then generates a control signal 34 based on the spiral track $18_0$ and the spiral track error, wherein the control signal 34 is applied to the actuator 22 in order to rotate an actuator arm 36 about a pivot to thereby actuate the head 20 radially over the disk 16. FIG. 2C illustrates a trajectory of the spiral track $18_0$ written on the disk 16 relative to an ideal spiral track 38. The trajectory of the ideal spiral track 38 changes at a constant slope over time as the disk 16 rotates at a constant speed, whereas the trajectory of the spiral track $18_0$ changes with a varying slope due to errors when writing the spiral track $18_0$. Accordingly, in one embodiment a spiral track error is generated based on a difference between a measured slope of the spiral track $18_0$ and a target slope of the ideal spiral track 38, and then the spiral track error is compensated when servoing the head 20 over the disk 16 based on the spiral track $18_0$.

Figure 3A:
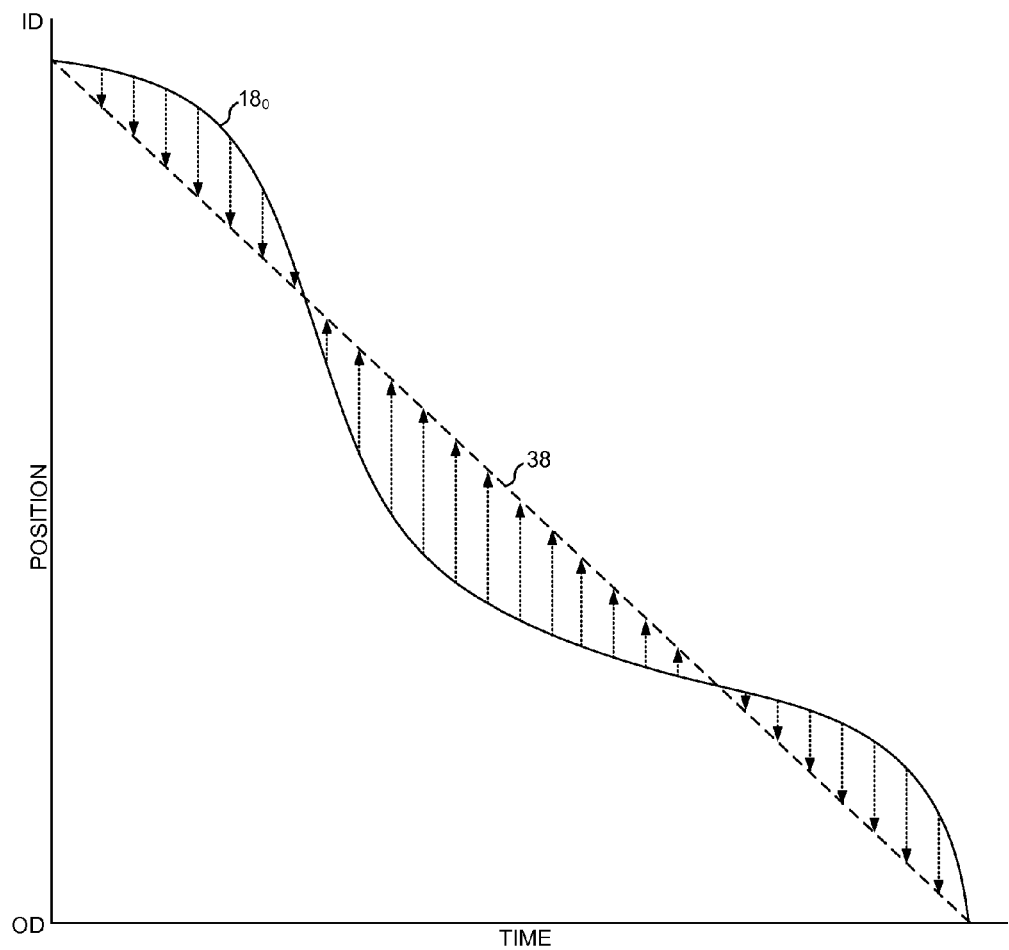
FIG. 3A shows an embodiment wherein the spiral track error is measured at a plurality of radial locations across the disk.

FIG. 3A illustrates an embodiment wherein the spiral track error is generated at a plurality of different radial locations across the disk 16 from an outer diameter (OD) to an inner diameter (ID). In one embodiment, when measuring a radial position of the head 20 based on the written spiral track $18_0$, the measured position is adjusted by the spiral track error (position error) so that the adjusted position corresponds to the radial location of the ideal spiral track 38.

Figure 3B:
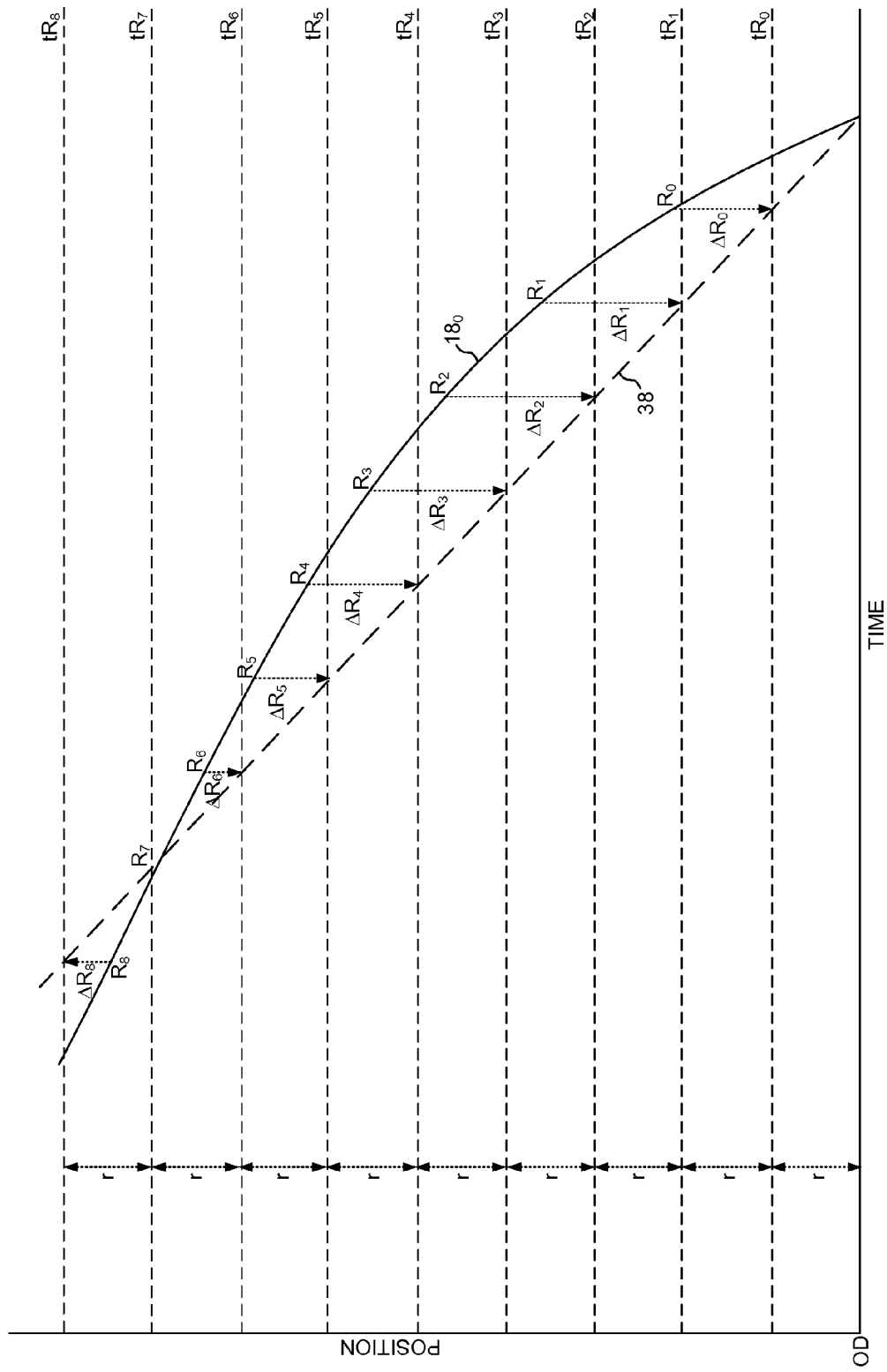
FIG. 3B illustrates the spiral track error at a number of radial locations near an outer diameter (OD) of the disk according to an embodiment.

The spiral track error may be generated in any suitable manner, wherein one embodiment is described in view of FIG. 3B which shows a magnified view of the written spiral track $18_0$ relative to the ideal spiral track 38 near the OD of the disk 16. The head is first positioned at radial location $R_0$ based on the written spiral track $18_0$. That is, the written spiral track $18_0$ is read to generate a radial position measurement, and the head is servoed radially over the disk 16 until the measured position corresponds to $R_0$. If the slope of the written spiral track $18_0$ matched the slope of the ideal spiral track 38, then the measured $R_0$ would correspond to the target radial location $tR_0$. However, because the slope of the written spiral track $18_0$ is steeper than the slope of the ideal spiral track 38, the measured radial location corresponding to $R_0$ will differ from the target radial location $tR_0$ based on the ideal spiral track 38 by a position error $\Delta R_0$. In one embodiment, this initial position error $\Delta R_0$ may be estimated according to:

$$\Delta R_0 = r - r \cdot \frac{s_0}{s_t}$$

where r represents a radial increment between the OD and the first radial location corresponding to $tR_0$, $s_0$ represents the measured slope of the spiral track $18_0$ at $R_0$, and $s_t$ represents the target slope (corresponding to the ideal spiral track 38). The head is then servoed over the disk 16 based on the written spiral track $18_0$ until the measured position corresponds to $R_1$. Due to the error in the slope of the written spiral track $18_0$, the resulting position error $\Delta R_1$ may be estimated according to:

$$\hat{R}_1 = \hat{R}_0 + r \cdot \frac{(s_1 + s_0)/2}{s_t};$$

$$\Delta R_1 = (2 \cdot r) - \hat{R}_1$$

where $\hat{R}_0 = tr_0 - \Delta R_0$. In general, the position error $\Delta R_i$ at each incremental radial location $tR_i$ may be estimated based on:

$$\hat{R}_i = \hat{R}_{i-1} + r \cdot \frac{(s_i + s_{i-1})/2}{s_t};$$

$$\Delta R_i = ((i+1) \cdot r) - \hat{R}_i;$$

$$i = 1, 2, \ldots, N-2$$

FIG. 3B illustrates how the position error $\Delta R_i$ changes in magnitude as the slope of the written spiral track $18_0$ changes, and in the example shown the polarity of the position error $\Delta R_8$ changes sign at $R_8$ due to the slope of the written spiral track $18_0$ being less than the slope of the ideal spiral track 38.

Figure 4A:
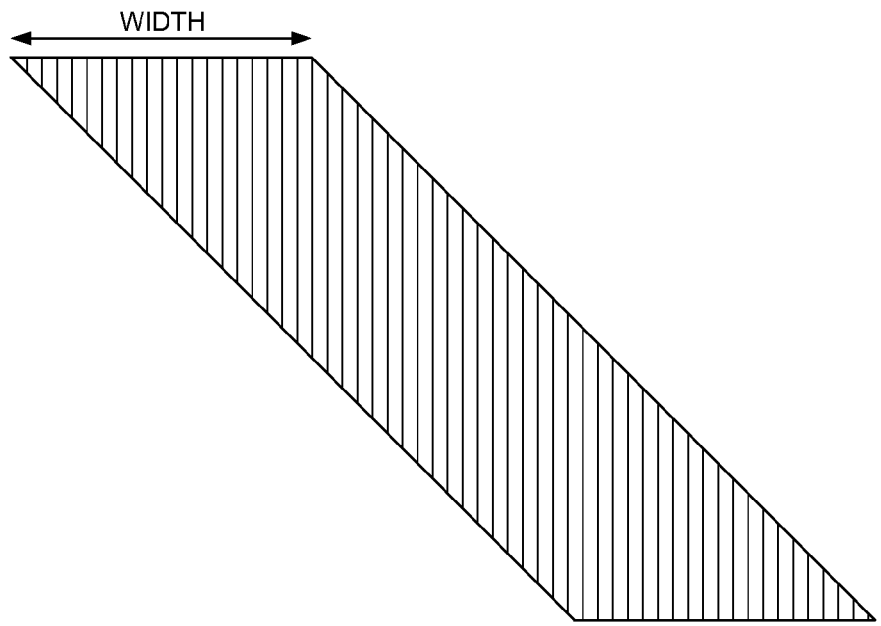
FIGS. 4A and 4B illustrate an embodiment wherein the slope of the spiral track is measured relative to a width of a spiral track crossing.
Figure 4B:
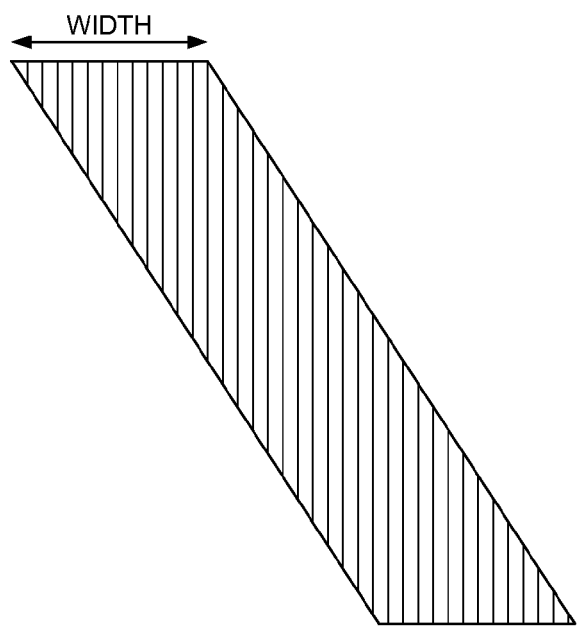

The slope of the written spiral track $18_0$ may be measured at each radial location $R_i$ in FIG. 3B using in any suitable technique. FIGS. 4A and 4B illustrate an embodiment wherein a width of the written spiral track $18_0$ varies proportionally with the slope. In one embodiment, the width of the written spiral track $18_0$ may be measured by evaluating the read signal that is generated as the head crosses over the written spiral track $18_0$ at a constant velocity. For example, the read signal may be integrated and the width of the written spiral track $18_0$ estimated based on the width of the resulting ramp signal. FIG. 4B illustrate how the width of the spiral track crossing signal decreases as the slope of the written spiral track $18_0$ increases as compared to the spiral track crossing shown in FIG. 4A.

The written spiral track $18_0$ shown in FIG. 2A may be used to servo the head 20 over the disk 16 during any suitable operation of the disk drive. In one embodiment, the written spiral track $18_0$ may represent a product servo track used to servo the head 20 over the disk 16 during normal write/read operations. In one embodiment, there may be a number of spiral servo tracks $18_0$-$18_N$ written to the disk 16 and processed to servo the head 20 during normal write/read operations. As described below with reference to FIG. 7, in one embodiment the measured radial position of the head 20 when servoing on the spiral servo tracks $18_0$-$18_N$ may be adjusted by the corresponding position error $\Delta R$ described above so that the head 20 is servoed over the disk 16 based on ideal spiral servo tracks.

Figure 5A:
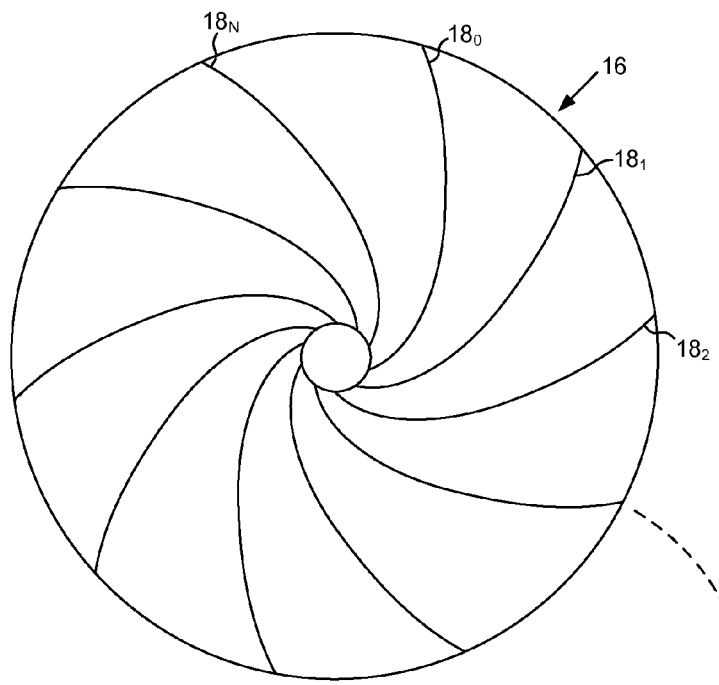
FIGS. 5A and 5B illustrate an embodiment wherein the disk comprises a plurality of spiral tracks which are processed to write concentric servo sectors to the disk.
Figure 5B:
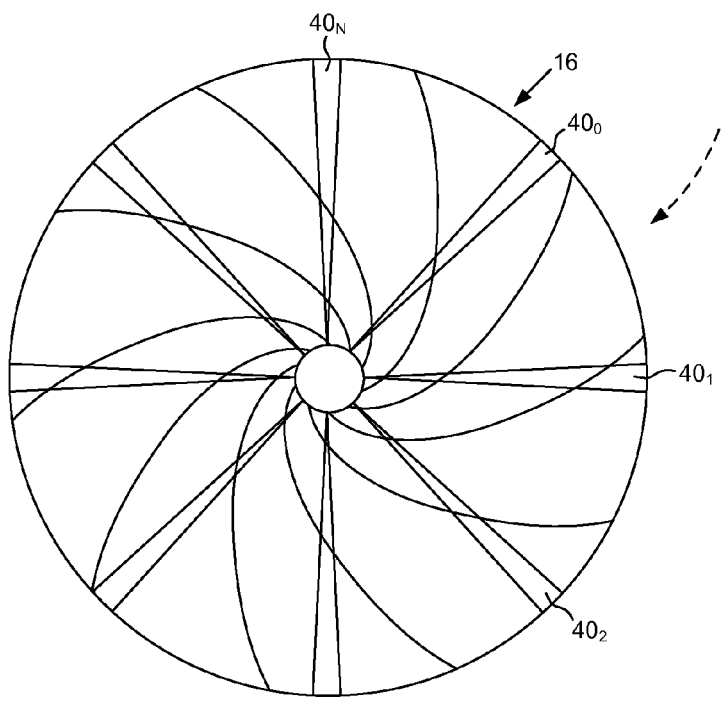

In another embodiment illustrated in FIGS. 5A and 5B, a number of spiral tracks $18_0$-$18_N$ may be written on the disk 16 and then processed to write concentric servo sectors $40_0$-$40_N$ on the disk 16, wherein the concentric servo sectors $40_0$-$40_N$ are used to servo the head 20 over the disk 16 during normal write/read operations. In the example embodiment shown in FIGS. 5A and 5B, each spiral track $18_i$ is written over a partial disk revolution, whereas in other embodiments each spiral track $18_i$ may be written over multiple disk revolutions as shown in FIG. 2A.

Figure 6A:
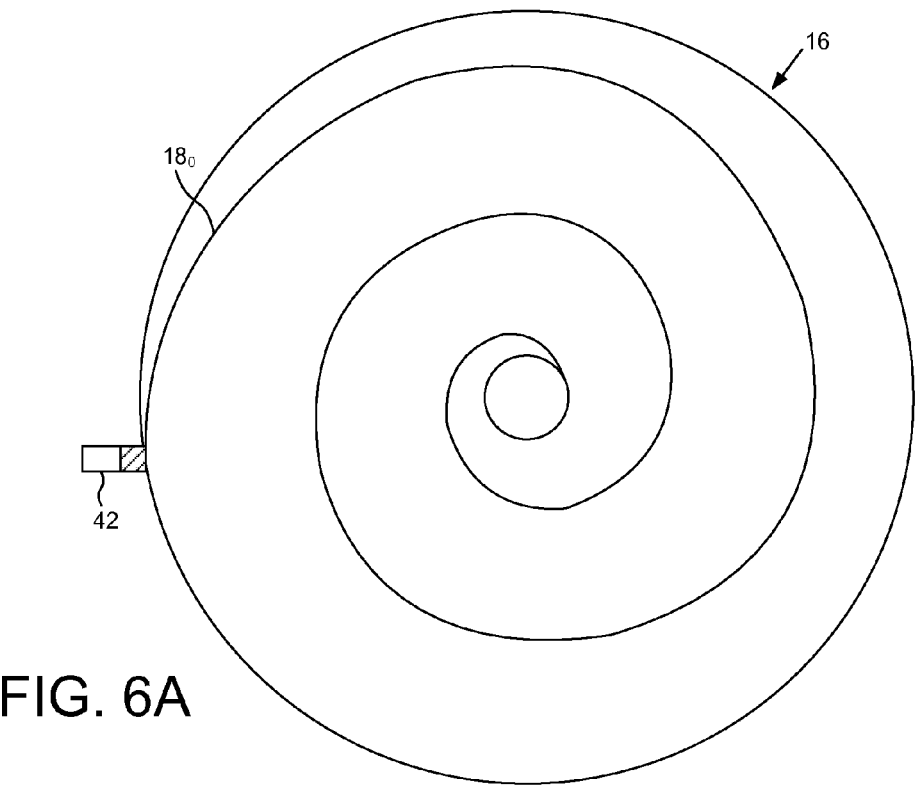
FIGS. 6A and 6B illustrate an embodiment wherein a spiral servo track is written to the disk by processing the spiral track.
Figure 6B:
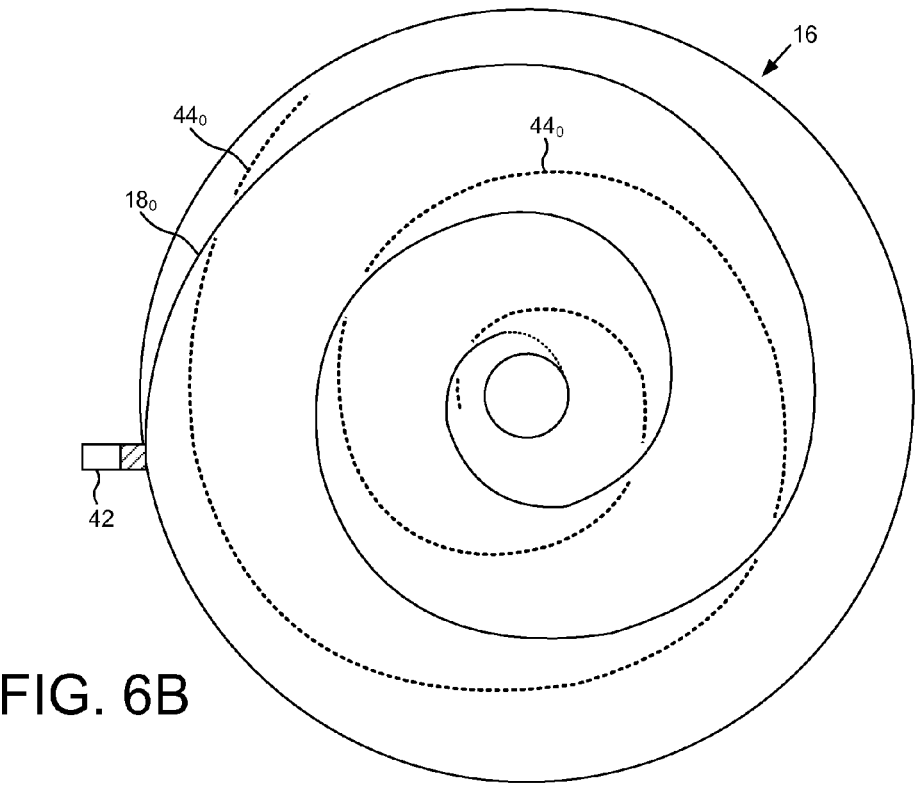

FIGS. 6A and 6B illustrate another embodiment wherein the spiral track $18_o$ may be used as a bootstrap spiral track used to write one or more spiral servo tracks $44_0$. In one embodiment, the bootstrap spiral track $18_0$ may be written while moving the head 20 from the ID of the disk 16 toward the OD until the head 20 contacts a ramp 42. In one embodiment, a number of bootstrap spiral tracks may be written on the disk by starting the writing at the ID at a different circumferential position (different rotation angle). FIG. 6B shows an embodiment wherein a spiral servo track $44_0$ is written to the disk 16 while servoing the head from the OD toward the ID of the disk 16. When the head 20 crosses over the bootstrap spiral track $18_0$, a radial position is measured and used to adjust the servoing of the head 20. When the radial position is measured, it is adjusted by the position error $\Delta R$ as described above so that the spiral servo track $44_0$ is written based on an ideal bootstrap spiral track. In one embodiment, a number of spiral servo tracks $44_0$-$44_N$ are written to the disk 16 which may be used as final servo tracks, or used to write concentric servo sectors as described above with reference to FIGS. 5A and 5B.

Figure 7:
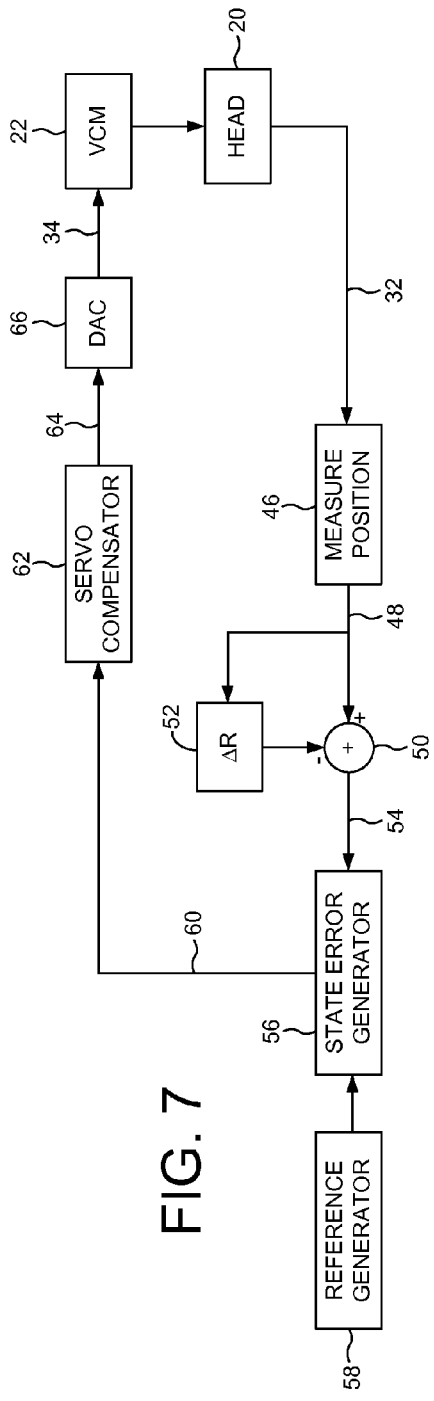
FIG. 7 shows a servo control system operable to actuate the head over the disk based on the spiral track and the spiral track error according to an embodiment.

FIG. 7 shows a servo control system implemented within the control circuitry 24 of FIG. 2A, wherein the read signal 32 emanating from the head 20 is processed at block 46 when crossing the spiral track $18_0$ to generate a measured position 48. The measured position 48 is adjusted at adder 50 by the corresponding position error $\Delta R$ generated at block 52 as described above to generate an adjusted position 54 that corresponds to the ideal spiral track 38. A state error generator 56 processes the adjusted position 54 and a reference position 58 to generate an error signal 60 (e.g., a position error signal (PES)). The error signal 60 is processed by a servo compensator 62 to generate a digital control signal 64 that is converted by a digital-to-analog converter (DAC) 66 into an analog control signal 34 applied to the VCM 22 in order to actuate the head 20 over the disk 16 so as to reduce the error signal 60. The servo control system of FIG. 7 may be used during normal write/read operations, or when writing concentric servo sectors to the disk as shown in FIG. 5B, or when writing spiral servo tracks to the disk as shown in FIG. 6B, or during any other suitable operation wherein the head 20 is servoed over the disk 16 based on a spiral track.

In one embodiment, the block 52 of FIG. 7 may generate an interpolated position error $\Delta R$ for adjusting the measured position 48. For example, when the measured position 48 indicates the head 20 is between radial location $R_0$ and $R_1$ in FIG. 3B, block 52 may generate the corresponding position error $\Delta R$ by interpolating between position error $\Delta R_0$ and position error $\Delta R_1$. In other words, in one embodiment the control circuitry 24 may interpolate the spiral track error (e.g., position error) in order to increase the resolution of the spiral track error.

The target slope of the ideal spiral track 38 shown in FIG. 3A may be generated in any suitable manner. In one embodiment, the target slope is predetermined based on a known ideal spiral track that should be written to the disk. In another embodiment, the control circuitry 24 may generate the target slope by averaging the measured slopes of the spiral track $18_0$ at the plurality of radial locations shown in FIG. 3B. For example, in one embodiment the control circuitry 24 may measure and save the slope of the spiral track $18_0$ at the different radial locations shown in FIG. 3B. The saved slope measurements may then be processed to generate the target slope (e.g., as the average), as well as to generate the spiral track errors (e.g., position errors) for each radial location.

Figure 8:
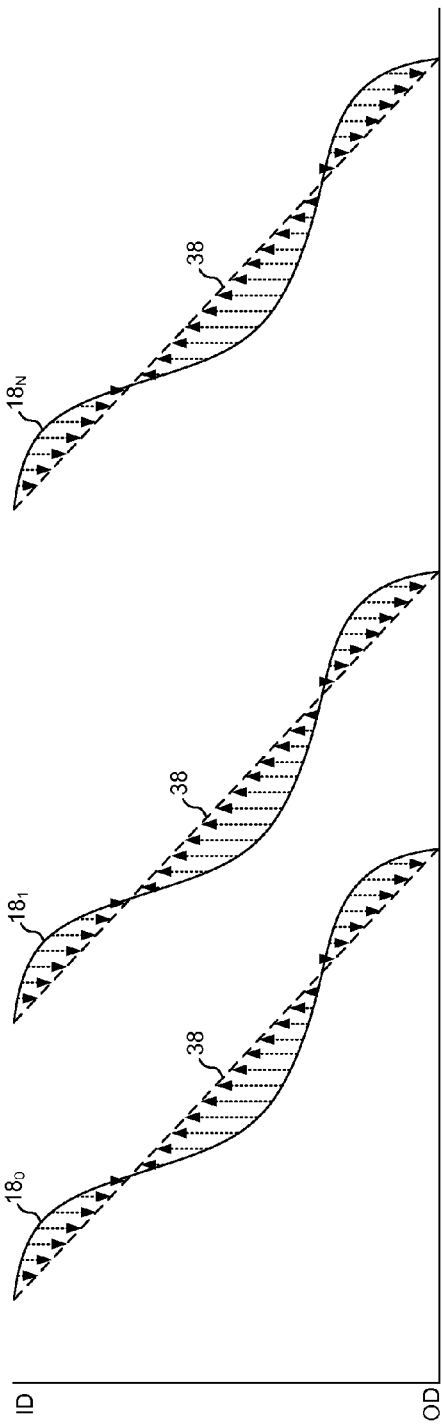
FIG. 8 shows an embodiment wherein the disk comprises a plurality of spiral tracks and an average spiral track error is generated by averaging the spiral track error generated for each spiral track.

In one embodiment, there may be a number of spiral tracks $18_0$-$18_N$ written to the disk 16 as illustrated in FIG. 8. The control circuitry 24 may generate the target slope and/or the spiral track errors for each individual spiral track, or in another embodiment, the control circuitry 24 may average the measurements to generate a target slope and/or spiral track errors used to process all of the spiral tracks $18_0$-$18_N$. For example, in one embodiment the control circuitry 24 may average the spiral track errors (e.g., position errors) generated for each spiral track $18_i$ at each radial location $R_i$ to generate a spiral track error that is applied to all of the spiral tracks (e.g., at block 52 of FIG. 7). In another embodiment, the control circuitry 24 may generate an independent spiral track error for each spiral track $18_i$ which is then generated at block 52 of FIG. 7, for example, using a lookup table indexed by the spiral track number.

The spiral track $18_0$ may comprise any suitable format, wherein in one embodiment, the spiral track $18_0$ is written as a high frequency signal interrupted periodically by a sync mark. When the head 20 moves radially over the disk 16, an eye pattern generated by reading the spiral track $18_0$ will shift (left or right) while the sync marks remain fixed (ideally). The shift in the eye pattern (detected from the high frequency signal) relative to the sync marks provides the position information for servoing the head 20.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk comprising at least a first spiral track and a second spiral track;
   a head;
   an actuator operable to actuate the head over the disk; and
   control circuitry operable to:
   measure a slope of the first spiral track at a plurality of radial locations across the disk;
   generate a first spiral track error at each radial location based on a difference between the measured slope of the first spiral track and a target slope;
   measure a slope of the second spiral track at a plurality of radial locations across the disk;
   generate a second spiral track error at each radial location based on a difference between the measured slope of the second spiral track and the target slope; and
   actuate the head over the disk based on the spiral track and the first and second spiral track errors.

2. The disk drive as recited in claim 1, wherein the spiral track error represents a position error between the spiral track and a nominal spiral track.

3. The disk drive as recited in claim 2, wherein the position error is generated based on:

$$\hat{R}_i = \hat{R}_{i-1} + r \cdot \frac{(s_i + s_{i-1})/2}{s_t};$$

$$\Delta R_i = ((i+1) \cdot r) - \hat{R}_i;$$

$$i = 1, 2, \ldots, N-2$$

where:
r represents a radial increment between each radial location;

$s_i$ represents the measured slope of the spiral track at radial location i;
$s_t$ represents the target slope;
R represents a measured radial position of the head;
ΔR represents the position error; and
N represents the plurality of radial locations.

4. The disk drive as recited in claim 1, wherein the control circuitry is further operable to interpolate the spiral track error to increase a resolution of the spiral track error.

5. The disk drive as recited in claim 2, wherein the control circuitry is further operable to actuate the head over the disk by:
  measuring a radial position of the head based on the spiral track;
  adjusting the measured radial position based on the position error to generate an adjusted radial position; and
  generating a control signal applied to the actuator based on the adjusted radial position.

6. The disk drive as recited in claim 5, wherein the control circuitry is further operable to write servo data to the disk while actuating the head over the disk such that the servo data is written based on the target slope of the spiral track.

7. The disk drive as recited in claim 6, wherein the servo data comprises servo sectors of concentric servo tracks.

8. The disk drive as recited in claim 7, wherein the servo data comprises a spiral servo track.

9. The disk drive as recited in claim 8, wherein the control circuitry is further operable to process the spiral servo track in order to write concentric servo sectors to the disk that define concentric servo tracks.

10. The disk drive as recited in claim 1, wherein the target slope is predetermined.

11. The disk drive as recited in claim 1, wherein the control circuitry is further operable to generate the target slope based on the measured slopes of the first and second spiral track.

12. A method of operating a disk drive comprising a disk comprising at least a first spiral track and a second spiral track, a head, and an actuator operable to actuate the head over the disk, the method comprising:
  measuring a slope of the first spiral track at a plurality of radial locations across the disk;
  generating a first spiral track error at each radial location based on a difference between the measured slope of the first spiral track and a target slope;
  measuring a slope of the second spiral track at a plurality of radial locations across the disk;
  generating a second spiral track error at each radial location based on a difference between the measured slope of the second spiral track and the target slope; and
  actuating the head over the disk based on the spiral track and the first and second spiral track errors.

13. The method as recited in claim 12, wherein the spiral track error represents a position error between the spiral track and a nominal spiral track.

14. The method as recited in claim 13, wherein the position error is generated based on:

$$\hat{R}_i = \hat{R}_{i-1} + r \cdot \frac{(s_i + s_{i-1})/2}{s_t};$$

$$\Delta R_i = ((i+1) \cdot r) - \hat{R}_i;$$

$$i = 1, 2, \ldots, N-2$$

where:
r represents a radial increment between each radial location;
$s_i$ represents the measured slope of the spiral track at radial location i;
$s_t$ represents the target slope;
R represents a measured radial position of the head;
ΔR represents the position error; and
N represents the plurality of radial locations.

15. The method as recited in claim 12, further comprising interpolating the spiral track error to increase a resolution of the spiral track error.

16. The method as recited in claim 13, further comprising actuating the head over the disk by:
  measuring a radial position of the head based on the spiral track;
  adjusting the measured radial position based on the position error to generate an adjusted radial position; and
  generating a control signal applied to the actuator based on the adjusted radial position.

17. The method as recited in claim 16, further comprising writing servo data to the disk while actuating the head over the disk such that the servo data is written based on the target slope of the spiral track.

18. The method as recited in claim 17, wherein the servo data comprises servo sectors of concentric servo tracks.

19. The method as recited in claim 18, wherein the servo data comprises a spiral servo track.

20. The method as recited in claim 19, further comprising processing the spiral servo track in order to write concentric servo sectors to the disk that define concentric servo tracks.

21. The method as recited in claim 13, wherein the target slope is predetermined.

22. The method as recited in claim 13, further comprising generating the target slope based on the measured slopes of the first and second spiral track.

* * * * *